US010894236B2

(12) United States Patent
Maier et al.

(10) Patent No.: US 10,894,236 B2
(45) Date of Patent: Jan. 19, 2021

(54) RADIAL ANNULAR COMPONENT AND HELICAL AXIAL COMPONENTS COUPLED TO AND EXTENDING FROM THE RADIAL COMPONENT

(71) Applicant: Dresser-Rand Company, Olean, NY (US)

(72) Inventors: William C. Maier, Almond, NY (US); Scott David Wisler, Cuba, NY (US)

(73) Assignee: DRESSER-RAND COMPANY, Olean, NY (US)

(*) Notice: Subject to any disclaimer, the term of this patent is extended or adjusted under 35 U.S.C. 154(b) by 0 days.

(21) Appl. No.: 16/349,726

(22) PCT Filed: Nov. 28, 2017

(86) PCT No.: PCT/US2017/063384
§ 371 (c)(1),
(2) Date: May 14, 2019

(87) PCT Pub. No.: WO2018/102284
PCT Pub. Date: Jun. 7, 2018

(65) Prior Publication Data
US 2020/0055008 A1    Feb. 20, 2020

Related U.S. Application Data

(60) Provisional application No. 62/428,087, filed on Nov. 30, 2016.

(51) Int. Cl.
*B01F 3/08* (2006.01)
*B01J 4/00* (2006.01)
(Continued)

(52) U.S. Cl.
CPC .......... *B01F 3/0865* (2013.01); *B01F 5/0601* (2013.01); *B01J 4/002* (2013.01);
(Continued)

(58) Field of Classification Search
CPC .............. F02C 7/222–228; B01J 4/004; B01J 2219/00772; B01J 2219/00493;
(Continued)

(56) References Cited

U.S. PATENT DOCUMENTS 4,198,360 A    4/1980 Shafranovsky et al.
6,250,796 B1 * 6/2001 Huang ...................... B01F 7/18
                                                           261/93

(Continued)

FOREIGN PATENT DOCUMENTS

RU        2506495 C1       12/2014
WO    WO-2011027570 A1 *  3/2011 ............ B01F 5/0644

OTHER PUBLICATIONS

PCT International Search Report and Written Opinion dated Feb. 16, 2018 corresponding to PCT Application No. PCT/US2017/063384 filed Nov. 28, 2017.

*Primary Examiner* — Laert Dounis

(57) ABSTRACT

A fluid distribution system (208) is provided for a reactor vessel (200) defining a reaction chamber (202). The fluid distribution system (208) may include a radial distribution component (224) positionable within the reaction chamber (202) and adjacent a vessel inlet (212) at an end portion of the reactor vessel (200). The radial distribution component (224) may include one or more annular distribution conduits (230) configured to receive a fluid mixture provided to the reactor vessel (200). The fluid distribution system (208) may also include an axial distribution component (226) positionable within the reaction chamber (202) to extend from the radial distribution component (224) along a longitudinal axis of the reactor vessel (200). The axial distribution component (230) may include a plurality of helical conduits (236) fluidly coupled with the one or more annular distribution conduits (230) and configured to receive the fluid mixture
(Continued)

from the one or more annular distribution conduits (230) and to disperse the fuel mixture uniformly within the reaction chamber (202).

15 Claims, 6 Drawing Sheets

(51) Int. Cl.
| | |
|---|---|
| *F23R 3/40* | (2006.01) |
| *B01J 19/24* | (2006.01) |
| *B01F 5/06* | (2006.01) |
| *F02C 3/20* | (2006.01) |
| *F02C 6/18* | (2006.01) |
| *F02C 7/08* | (2006.01) |

(52) U.S. Cl.
CPC .............. *B01J 4/004* (2013.01); *B01J 4/005* (2013.01); *B01J 19/2405* (2013.01); *F23R 3/40* (2013.01); *B01J 2219/00772* (2013.01); *F02C 3/20* (2013.01); *F02C 6/18* (2013.01); *F02C 7/08* (2013.01); *F05D 2240/35* (2013.01)

(58) Field of Classification Search
CPC .............. B01J 19/26; B01J 2208/00902; B01J 2208/00911; F23K 2900/05081; F23R 3/40; F23R 3/425
See application file for complete search history.

(56) References Cited

U.S. PATENT DOCUMENTS

| | | | |
|---|---|---|---|
| 8,926,917 B2* | 1/2015 | Maslov | F02C 3/20 |
| | | | 165/108 |
| 2009/0158743 A1* | 6/2009 | Francis | F23D 11/383 |
| | | | 60/748 |
| 2010/0275611 A1* | 11/2010 | Prabhu | F02C 7/224 |
| | | | 60/780 |
| 2011/0199855 A1 | 8/2011 | Hanada | |
| 2012/0137696 A1 | 6/2012 | Desai et al. | |
| 2012/0152722 A1* | 6/2012 | Birnbach | C01B 17/745 |
| | | | 204/157.15 |
| 2014/0352321 A1 | 12/2014 | Haynes et al. | |
| 2015/0047361 A1 | 2/2015 | Williams et al. | |
| 2015/0129475 A1 | 5/2015 | Pickens | |
| 2016/0102631 A1 | 4/2016 | Lynn | |
| 2017/0165632 A1* | 6/2017 | Homewood | B01J 19/006 |
| 2017/0248318 A1* | 8/2017 | Kulkarni | F23R 3/14 |

* cited by examiner

RADIAL ANNULAR COMPONENT AND HELICAL AXIAL COMPONENTS COUPLED TO AND EXTENDING FROM THE RADIAL COMPONENT

BACKGROUND

In industrial processes, chemical reactions may occur in a reaction chamber of a vessel commonly referred to as a reactor vessel. Generally, to maximize the efficacy of some chemical reactions in reactor vessels, it is advantageous to carefully control the spatial distribution of one or more fluid flow streams within the reaction chamber. Various approaches to achieve this spatial distribution are known in the art. For example, one conventional approach includes the use of a gas distribution system disposed in the reaction chamber. The gas distribution system may include a sparger in fluid communication with the reactor vessel inlet and extending along a longitudinal axis of the reactor vessel. The sparger may carry multiple transverse gas distribution arms axially spaced from one another. Each arm may define multiple ports that provide fluid communication into a region of the reaction chamber surrounding the gas distribution system.

Although the gas distribution system disclosed above may provide suitable fluid flow distribution, the gas distribution system may have certain drawbacks. For example, the gas distribution system may have prohibitive mechanical limitations in applications including reaction chambers filled or loaded with solid particulate filler provided for thermal mass and/or catalytic effects in certain reactions. Often, in such cases, the gas distribution system disposed in the reaction chamber has to accommodate relative motion between the solid particulate filler, the reactor vessel, and the gas distribution system components. This relative motion can be caused by uneven heating and differing thermal expansion coefficients of the various gas distribution system components, e.g., the sparger and transverse distribution arms. In particular, when the reaction vessel is subject to heat-up or cool-down transients, the gas distribution system may move vertically with respect to the solid particulate filler. Accordingly, such movement may put deleterious stress levels on at least the transverse distribution arms and the particles of the solid particulate filler, thereby resulting in several failure modes arising from pulverized particles of the solid particulate filler and/or compromised gas distribution system components.

What is needed, therefore, is a fluid distribution system for a reactor vessel which provides suitable spatial distribution of one or more fluid streams within the reaction chamber of the reactor vessel while addressing the structural and functional drawbacks noted above.

SUMMARY

Embodiments of the disclosure may provide a fluid distribution system for a reactor vessel defining a reaction chamber. The fluid distribution system may include a radial distribution component positionable within the reaction chamber and adjacent a vessel inlet at an end portion of the reactor vessel. The radial distribution component may include a fluid distribution system inlet configured to couple with the vessel inlet and receive a fluid mixture provided to the reactor vessel. The radial distribution component may also include one or more annular distribution conduits fluidly coupled with the fluid distribution system inlet and configured to receive the fluid mixture provided to the fluid distribution system. The fluid distribution system may also include an axial distribution component positionable within the reaction chamber to extend from the radial distribution component along a longitudinal axis of the reactor vessel. The axial distribution component may include a plurality of helical conduits fluidly coupled with the one or more annular distribution conduits and configured to receive the fluid mixture from the one or more annular distribution conduits and to disperse the fuel mixture uniformly within the reaction chamber.

Embodiments of the disclosure may further provide a reactor vessel. The reactor vessel may include a longitudinal axis and a housing extending along the longitudinal axis and having an outer surface and an inner surface, the inner surface defining a reaction chamber configured to receive a dispersed fluid mixture therein. The reactor vessel may also include a vessel inlet disposed at a first end of the housing and fluidly coupled to the reaction chamber, and a vessel outlet disposed at a second end of the housing axially opposing the first end of the housing, the vessel outlet fluidly coupled to the reaction chamber. The reactor vessel may further include a fluid distribution system disposed within the reaction chamber and fluidly coupled to the vessel inlet. The fluid distribution system may include a radial distribution component disposed adjacent the first end of the housing and fluidly coupled to the vessel inlet. The radial distribution component may be configured to receive a fluid mixture provided to the reactor vessel. The fluid distribution system may also include an axial distribution component extending from the radial distribution component along the longitudinal axis of the reactor vessel. The axial distribution component may include a plurality of helical conduits fluidly coupled with the radial distribution component and configured to receive the fluid mixture from the radial distribution component and to disperse the fuel mixture uniformly within the reaction chamber.

Embodiments of the disclosure may further provide a gas turbine system. The gas turbine system may include a compressor configured to receive a fluid mixture from a fuel source and an oxygen source and compress the fluid mixture. The fluid mixture may include a fuel component and an oxygen component. The gas turbine system may also include a reactor vessel fluidly coupled to the compressor and configured to receive a compressed fluid mixture in a reaction chamber defined by an inner surface of a housing of the reactor vessel and to oxidize the fuel component of the fluid mixture, thereby generating thermal energy. The reactor vessel may include a fluid distribution system configured to uniformly disperse the compressed fluid mixture within the reaction chamber. The fluid distribution system may include a radial distribution component disposed adjacent an end portion of the housing and fluidly coupled to a vessel inlet of the reactor vessel. The radial distribution component may be configured to receive the compressed fluid mixture provided to the reactor vessel. The fluid distribution system may also include an axial distribution component extending from the radial distribution component along a longitudinal axis of the reactor vessel. The axial distribution component may include a plurality of helical conduits fluidly coupled with the radial distribution component and configured to receive the compressed fluid mixture from the radial distribution component and to disperse the compressed fluid mixture uniformly within the reaction chamber. The gas turbine system may further include an expander fluidly coupled to the reactor vessel and configured to convert the thermal energy generated by the compressed fluid mixture to mechanical energy.

BRIEF DESCRIPTION OF THE DRAWINGS

The present disclosure is best understood from the following detailed description when read with the accompanying Figures. It is emphasized that, in accordance with the standard practice in the industry, various features are not drawn to scale. In fact, the dimensions of the various features may be arbitrarily increased or reduced for clarity of discussion.

DETAILED DESCRIPTION

Figure 1:
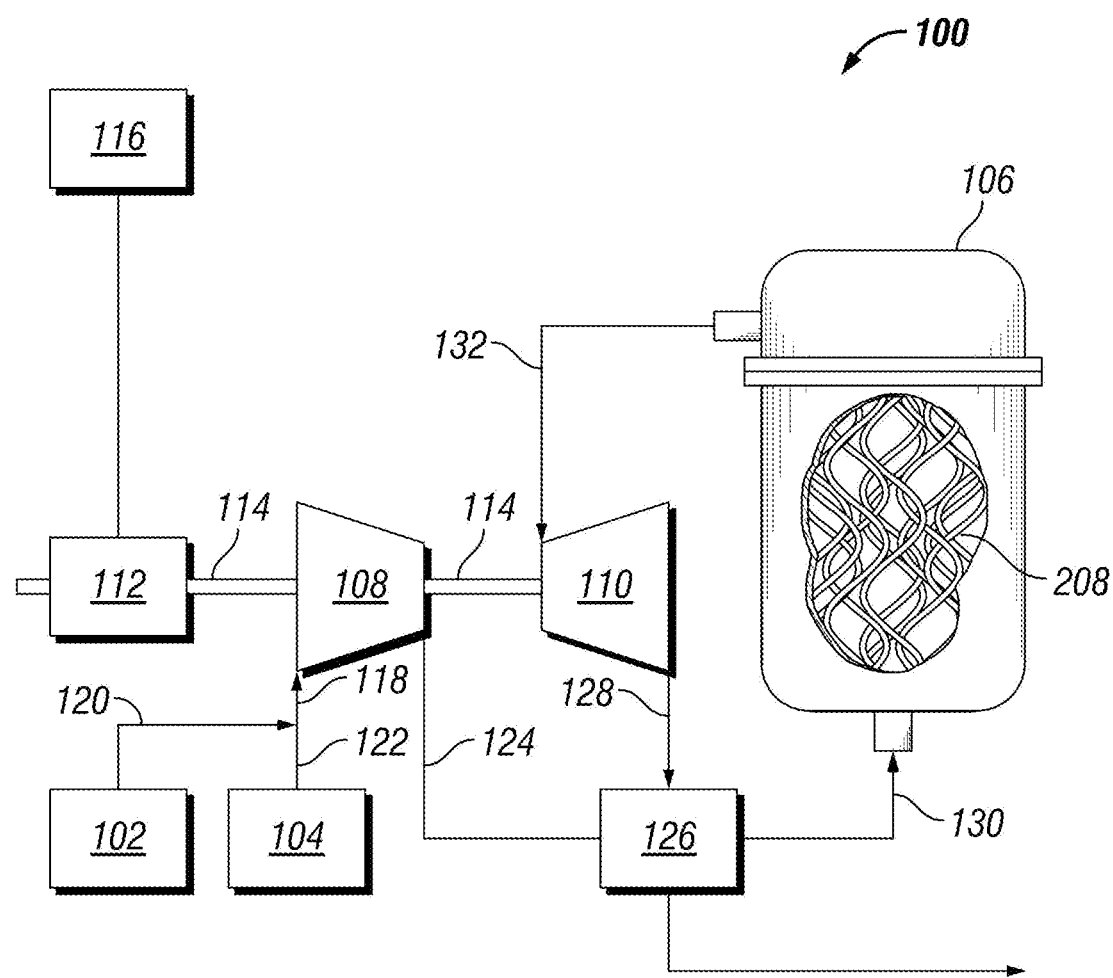
FIG. 1 illustrates a schematic of an exemplary gas turbine system, according to one or more embodiments of the disclosure.

It is to be understood that the following disclosure describes several exemplary embodiments for implementing different features, structures, or functions of the invention. Exemplary embodiments of components, arrangements, and configurations are described below to simplify the present disclosure; however, these exemplary embodiments are provided merely as examples and are not intended to limit the scope of the invention. Additionally, the present disclosure may repeat reference numerals and/or letters in the various exemplary embodiments and across the Figures provided herein. This repetition is for the purpose of simplicity and clarity and does not in itself dictate a relationship between the various exemplary embodiments and/or configurations discussed in the various Figures. Moreover, the formation of a first feature over or on a second feature in the description that follows may include embodiments in which the first and second features are formed in direct contact, and may also include embodiments in which additional features may be formed interposing the first and second features, such that the first and second features may not be in direct contact. Finally, the exemplary embodiments presented below may be combined in any combination of ways, i.e., any element from one exemplary embodiment may be used in any other exemplary embodiment, without departing from the scope of the disclosure.

Additionally, certain terms are used throughout the following description and claims to refer to particular components. As one skilled in the art will appreciate, various entities may refer to the same component by different names, and as such, the naming convention for the elements described herein is not intended to limit the scope of the invention, unless otherwise specifically defined herein. Further, the naming convention used herein is not intended to distinguish between components that differ in name but not function. Additionally, in the following discussion and in the claims, the terms "including" and "comprising" are used in an open-ended fashion, and thus should be interpreted to mean "including, but not limited to." All numerical values in this disclosure may be exact or approximate values unless otherwise specifically stated. Accordingly, various embodiments of the disclosure may deviate from the numbers, values, and ranges disclosed herein without departing from the intended scope. Furthermore, as it is used in the claims or specification, the term "or" is intended to encompass both exclusive and inclusive cases, i.e., "A or B" is intended to be synonymous with "at least one of A and B," unless otherwise expressly specified herein.

FIG. 1 illustrates a schematic of an exemplary gas turbine system 100, according to one or more embodiments of the disclosure. The gas turbine system 100 may be configured to oxidize fuel and use the heat energy released by the oxidation process to generate mechanical energy and, in some embodiments, to generate electrical power. The fuel may be a component of a fluid mixture supplied at least in part by an oxygen source 102 and a fuel source 104 in fluid communication with the gas turbine system 100. As configured, the gas turbine system 100 illustrated in FIG. 1 may oxidize all or substantially all of the fuel component of the fluid mixture, such that little or no fuel is wasted or discharged into the environment.

Figure 2:
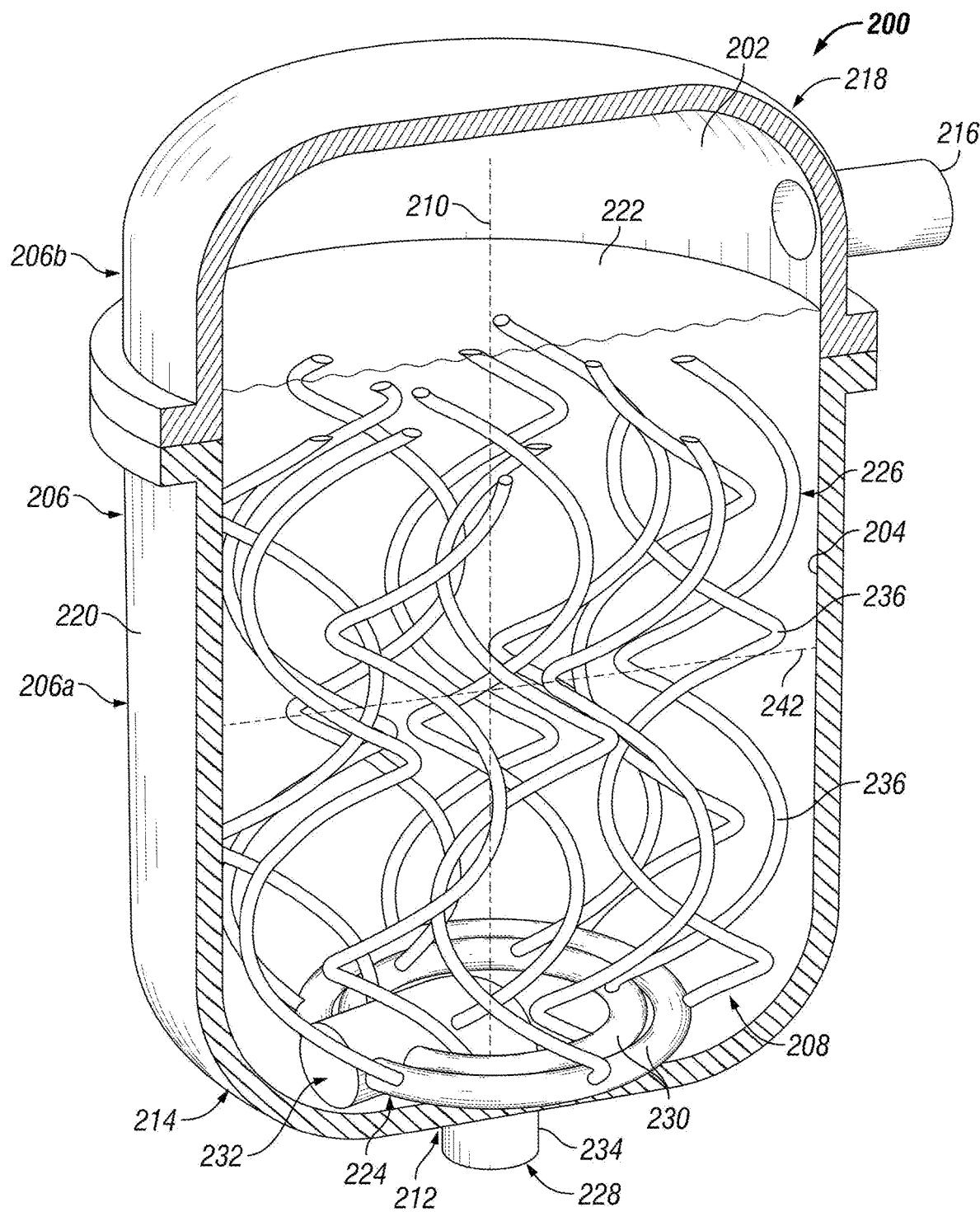
FIG. 2 illustrates a perspective view of an exemplary reactor vessel, with a portion removed for visibility, which may be used in the gas turbine system of FIG. 1, according to one or more embodiments of the disclosure.

The oxidation of the fuel component of the fluid mixture may occur in a reactor vessel 106 of the gas turbine system 100. Referring now to FIG. 2 with continued reference to FIG. 1, FIG. 2 illustrates a perspective view of the reactor vessel 200, with a portion removed for visibility, which may be used in place of the reactor vessel 106 of the gas turbine system 100 of FIG. 1, according to one or more embodiments of the disclosure. The reactor vessel 200 may be configured to receive the fluid mixture and to oxidize the fuel component of the fluid mixture in a reaction chamber 202 defined by an interior perimeter 204 of a housing 206 of the reactor vessel 200. The reactor vessel 200 may include a fluid distribution system 208 disposed within the reaction chamber 202 and configured to distribute the fluid mixture including at least the fuel component and an oxygen component from the oxygen source 102 throughout one or more oxidation zones in the reaction chamber 202 where the fuel component of the fluid mixture is oxidized. In an exemplary embodiment, the fluid distribution system 208 may distribute the fluid mixture into multiple locations in one or more oxidation zones of the reaction chamber 202, thereby sustaining oxidation by receiving heat from the reaction chamber 202 but imparting heat of oxidation back to the reaction chamber 202 to sustain a continuous oxidation process as additional fluid mixture flows into the reaction chamber 202.

The fuel source 104 may be configured to provide the fuel component of the fluid mixture to the gas turbine system 100 for sustaining the oxidation process in the reaction chamber 202. The fuel source may be, in one or more embodiments, a subterranean well, a pipeline, a storage tank, or an output or byproduct from another chemical process at the site of the gas turbine system 100. For example, the fuel source may be or include a hydrocarbon well, a hydrocarbon pipeline, a cattle belch, a swampland, a rice farm, and fermented organic matter. Other fuel source examples may be or include manure, municipal waste, wetlands, and drilling and recover operations.

The fuel source 104 may provide a single type of fuel and/or multiple types of fuels, one or all of which may be oxidized in the same reaction chamber 202. The fuel source may provide hydrocarbon fuels including, but not limited to, methane, ethane, propane, butane, kerosene, and gasoline. In other embodiments, the fuel source may provide a fuel including include nitrogen or carbon dioxide in addition to one or more hydrocarbons. In still other embodiments, the fuel source may provide hydrogen fuel. The fuel provided by the fuel source 104 to the gas turbine system 100 may be initially gaseous or may be in a liquid or solid phase before being converted to a gas or vapor. In some embodiments, the fuel source may include a gasifier that generates gaseous fuel from solids. In other embodiments, the fuel source may provide fuel mixed with water, and fuel from the fuel source 104 includes water vapor.

The oxygen source 102 may be configured to provide oxygen for the oxidation process in the reaction chamber 202. The oxygen source 102 may provide a gas containing oxygen, which may be mixed with the fuel from the fuel source 104 prior to oxidizing the fuel component of the fluid mixture. In one embodiment, the oxygen source 102 may be or include air from the atmosphere surrounding the gas turbine system 100. In another embodiment, the oxygen source 102 may be or include air from a tank or cylinder of compressed or non-compressed air. The air provided from the oxygen source 102 may contain oxygen at any concentration sufficient for the oxidation of the fuel. In addition to oxygen, the air provided from the oxygen source 102 may include other gases including, but not limited to, nitrogen and argon.

The gas turbine system 100 may further include a compressor 108 and a gas expander 110. In embodiments in which electrical power is generated, the gas turbine system 100 may also include a generator 112. As illustrated in FIG. 1, the generator 112 may be mechanically coupled to the gas expander 110 via a common shaft 114. In other embodiments, a rotary shaft (not shown) of the generator 112 and a drive shaft (not shown) of the gas expander 110 may be coupled via a coupling or a gearbox (not shown). In operation, the heat energy released by the oxidation process in the reactor vessel 200 may be converted to mechanical energy via the gas expander 110. In embodiments including the generator 112, the converted mechanical energy of the gas expander 110 may drive the generator 112 directly via the common shaft 114, or indirectly via the gearbox, thereby generating electrical power. The generated electrical power may be used to power other components (e.g., actuators, control systems, sensors, and electric motors) of the gas turbine system 100 or may be provided to an electrical grid 116 in electrical communication with the gas turbine system 100.

In some embodiments, the compressor 108 may be coupled to the gas expander 110 via the common shaft 114. In other embodiments, a rotary shaft (not shown) of the compressor 108 and a drive shaft (not shown) of the gas expander 110 may be coupled via a coupling or a gearbox (not shown). The gas expander 110 may drive the compressor 108 directly via the common shaft 114, or indirectly via the gearbox. In other embodiments, the compressor 108 may be operative coupled to and driven by a driver other than the gas expander 110. For example, the driver may be a motor and more specifically may be an electric motor, such as a permanent magnet motor, and may include a stator (not shown) and a rotor (not shown). It will be appreciated, however, that other embodiments may employ other types of electric motors including, but not limited to, synchronous motors, induction motors, and brushed DC motors. The driver may also be a hydraulic motor, an internal combustion engine, a steam turbine, or any other device capable of driving the compressor either directly or through a power train.

The compressor 108 may be fluidly coupled to the fuel source 104 and the oxygen source 102 via lines 118, 120, and 122. Accordingly, the oxygen provided from the oxygen source 102 and the fuel provided from the fuel source 104 may be mixed with one another and the resulting fluid mixture having a fuel component and an oxygen component may be fed to the compressor 108 via line 118. The gas turbine system 100 may further include a mixer (not shown) configured to receive a fluid including oxygen from the oxygen source 102 via line 120 and a fluid including fuel from the fuel source 104 via line 122 to mix the fluids received and to provide the resulting fluid mixture to the compressor 108 via line 118. In other embodiments, the oxygen may be mixed with the fuel without a mixer. For example, the oxygen may be fed via line 120 to mix with the fuel in line 122 and form the fluid mixture within line 122 before proceeding to the compressor 108 via line 118. The fluid mixture provided to the compressor 108 may be a homogeneous mixture, or in some embodiments, may be a heterogeneous mixture.

The compressor 108 may be configured to compress the fluid mixture provided from the fuel source 104 and the oxygen source 102. To that end, the fluid mixture may flow through a compressor inlet (not shown) of the compressor 108, where the fluid mixture in an exemplary embodiment may be drawn to and through an impeller (not shown) of the compressor 108 driven by the gas expander 110, thereby increasing the static pressure and/or velocity of the fluid mixture. The fluid mixture may be directed to a diffuser (not shown) of the compressor 108, where kinetic energy of the fluid mixture is converted into increased static pressure. The compressed fluid mixture may be discharged from the compressor 108 to line 124 via a compressor outlet (not shown).

The oxidation process typically requires heat for the fuel component of the fluid mixture to be oxidized. Accordingly, in an exemplary embodiment, the gas turbine system 100 may also include a heat exchanger 126 fluidly coupled with the compressor 108 via line 124 and configured to pre-heat the fluid mixture received from the compressor 108 prior to the fluid mixture being fed into the reactor vessel 200. The heat exchanger 126 may also be fluidly coupled with the gas expander 110 and configured to receive exhaust gas from the gas expander 110 via line 128. The heat exchanger 126 may utilize heat provided from the exhaust gas to pre-heat the fluid mixture flowing therethrough. In an exemplary embodiment, the heat exchanger 126 may transfer thermal energy from the higher temperature exhaust gas provided by the gas expander 110 to the lower temperature fluid mixture received from the compressor 108, thereby pre-heating the fluid mixture. Accordingly, the heat exchanger 126 may be in some embodiments a gas-to-gas heat exchanger, such as a shell and tube heat exchanger, adapted to also receive a flow of the exhaust gas as a heating medium for increasing the temperature of the fluid mixture. In other embodiments, the heat exchanger 126 may be a plate/fin heat exchanger or a printed circuit heat exchanger, without departing from the scope of the disclosure. In another embodiment, the heat exchanger 126 may utilize heat provided from an external source (e.g., waste heat stream) in place of or in addition to the exhaust gas from the gas expander 110 to pre-heat the fluid mixture flowing therethrough.

In an exemplary embodiment, the reactor vessel 200 may be fluidly coupled with the heat exchanger 126 and thus may receive the pre-heated fluid mixture from the heat exchanger 126 via line 130. In another embodiment, the reactor vessel 200 may be directly fluidly coupled to the compressor 108, such that the compressor 108 may communicate the fluid mixture into the reactor vessel 200 without the fluid mixture being pre-heated. The reaction chamber 202 may be configured to retain the fluid mixture received from the heat exchanger 126, or compressor 108 in other embodiments, and to retain the fluid mixture in the reaction chamber 202 as the fuel component of the fluid mixture oxidizes.

As most clearly seen in FIG. 2, the reactor vessel 200 may have a longitudinal axis 210 extending along an axial length of the reactor vessel 200, and the housing 206 of the reactor vessel 200 may form or be coupled to a vessel inlet 212 at an axial end 214 thereof. The vessel inlet 212 may be in fluid communication with the heat exchanger 126 (or compressor 108 in embodiments in which the heat exchanger 126 is absent), such that the fluid mixture may enter the reaction chamber 202 via line 130 and the vessel inlet 212. The housing 206 of the reactor vessel 200 may form or be coupled to a vessel outlet 216 at an axial end 218 thereof axially opposing the vessel inlet 212. The vessel outlet 216 may be in fluid communication with the gas expander 110, such that the oxidized fluid mixture may exit the reaction chamber 202 via the vessel outlet 216 and line 132 and enter the gas expander 110.

The housing 206 may be a single unitary piece (not shown) or may be formed from separate housing components 206a and 206b as illustrated in FIG. 2. The separate housing components 206a, 206b may include a first housing component 206a including the vessel inlet 212 and a generally cylindrical sidewall 220, and a second housing component 206b including the vessel outlet 216. The first and second housing components 206a, 206b may be coupled to each other via one or more fasteners (not shown). Exemplary fasteners include, but are not limited to, bolts, clamps, and the like.

The interior perimeter 204 or inner surface of the housing 206 defining the reaction chamber 202 may be lined with insulating refractory material. In addition to the refractory material liner, the reaction chamber 202 may be filled with a solid particulate, referred to as filler material 222. The filler material 222 may be a high temperature, heat-absorbing and/or heat-resistant material, such as ceramic or rock. The filler material 222 may have a thermal mass that stabilizes temperatures for gradual oxidation of the fuel by transmitting heat to the incoming gases of the fluid mixture and receiving heat from the oxidized gases. In some cases, the thermal mass of the refractory material liner in the reaction chamber 202 may act as a dampener, absorbing heat and preventing excessive temperatures that could damage the gas expander 110 and/or produce unwanted byproducts (e.g., nitrogen oxides, carbon dioxides, volatile organic compounds and/or others). In some cases, the thermal mass of the refractory material liner in the reaction chamber 202 may provide a temporary source of heat energy, which may help sustain oxidation of the fuel.

Generally, the reaction chamber 202 defined by the inner perimeter 204 of the housing 206 may have any geometry and/or orientation, and may define a primary direction of flow of the fluid mixture through the reaction chamber 202 (e.g., from the vessel inlet 212 to the vessel outlet 216) dependent on the structure of the reaction chamber 202. For example, the reaction chamber 202 shown in FIG. 2 has an internal geometry with a vessel outlet 216 near the upper axial end 218 of the reaction chamber 202. As such, in FIG. 2, the fluid mixture flows through the reaction chamber 202 primarily in an upward direction. Notably, within the primary direction of flow of the fluid mixture through the reaction chamber 202, there may be non-primary flows such as localized swirls, eddies, slipstreams and otherwise.

The volume and shape of the reaction chamber 202 in conjunction with the fluid distribution system 208 may be sized and configured to provide a controlled flow and flow rate through the reaction chamber 202 to allow for sufficient dwell time for the complete oxidation of the fuel component of the fluid mixture. To that end, the reactor vessel 200 may include one or more sensors (not shown) disposed in the reaction chamber 202 and configured to detect properties such as temperature, pressure, flow rate, or other properties relevant to the startup and/or operation of the gas turbine system 100. The reaction chamber 202 may also include internal structures and/or devices (not shown) that control aspects of the oxidation process. For example, the reaction chamber may include flow diverters, valves, and/or other features that control temperature, pressure, flow rate, and/or other aspects of fluids in the reaction chamber 202.

Figure 3A:
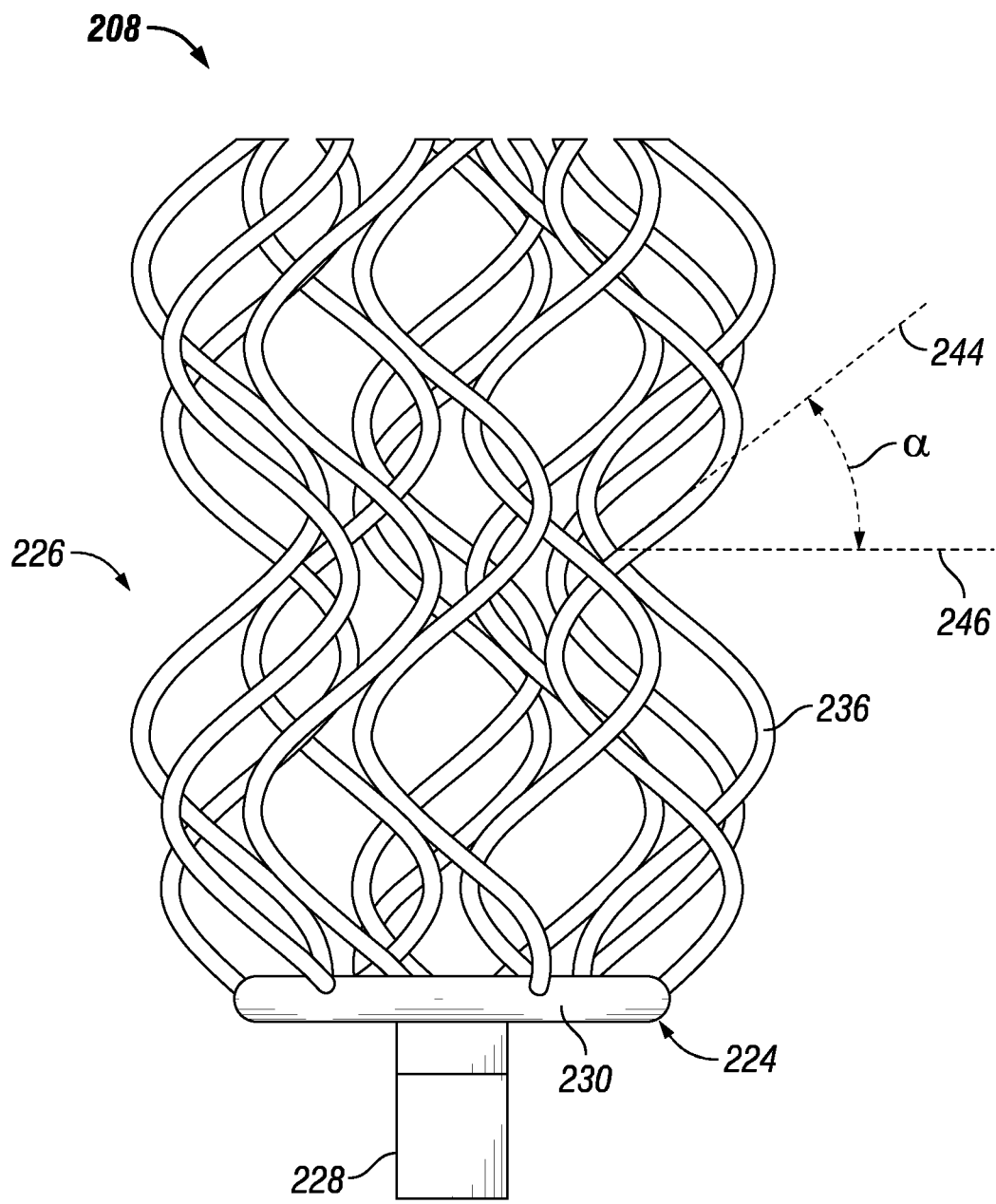
FIG. 3A illustrates a rear view of a fluid distribution system for the reactor vessel, according to one or more embodiments of the disclosure.
Figure 3B:
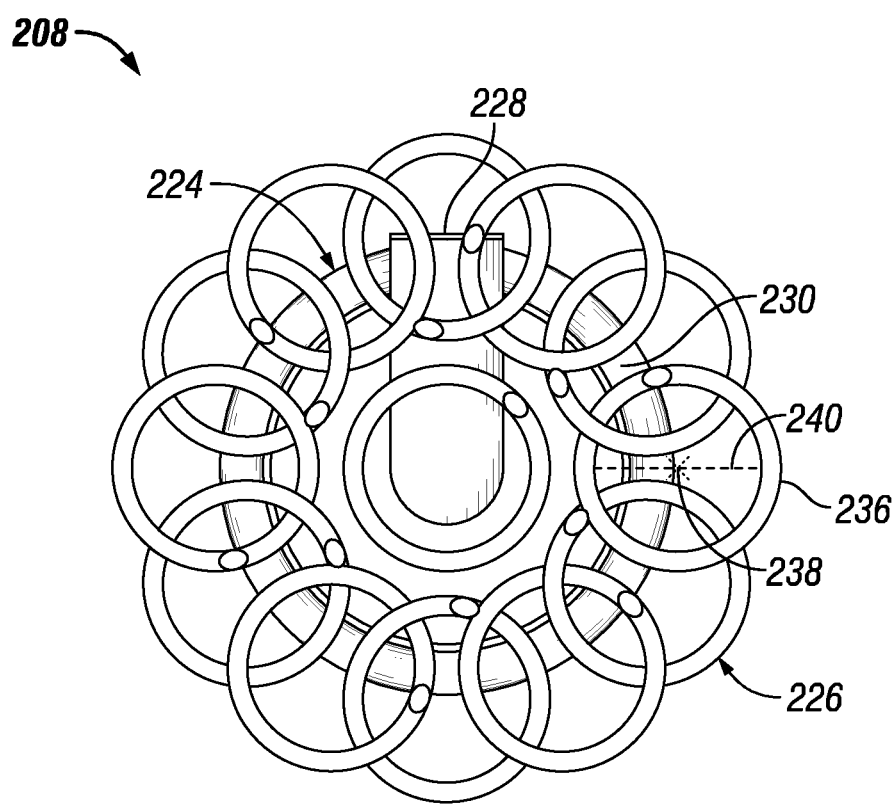
FIG. 3B illustrates a top view of the fluid distribution system of FIG. 3A, according to one or more embodiments of the disclosure.
Figure 3C:
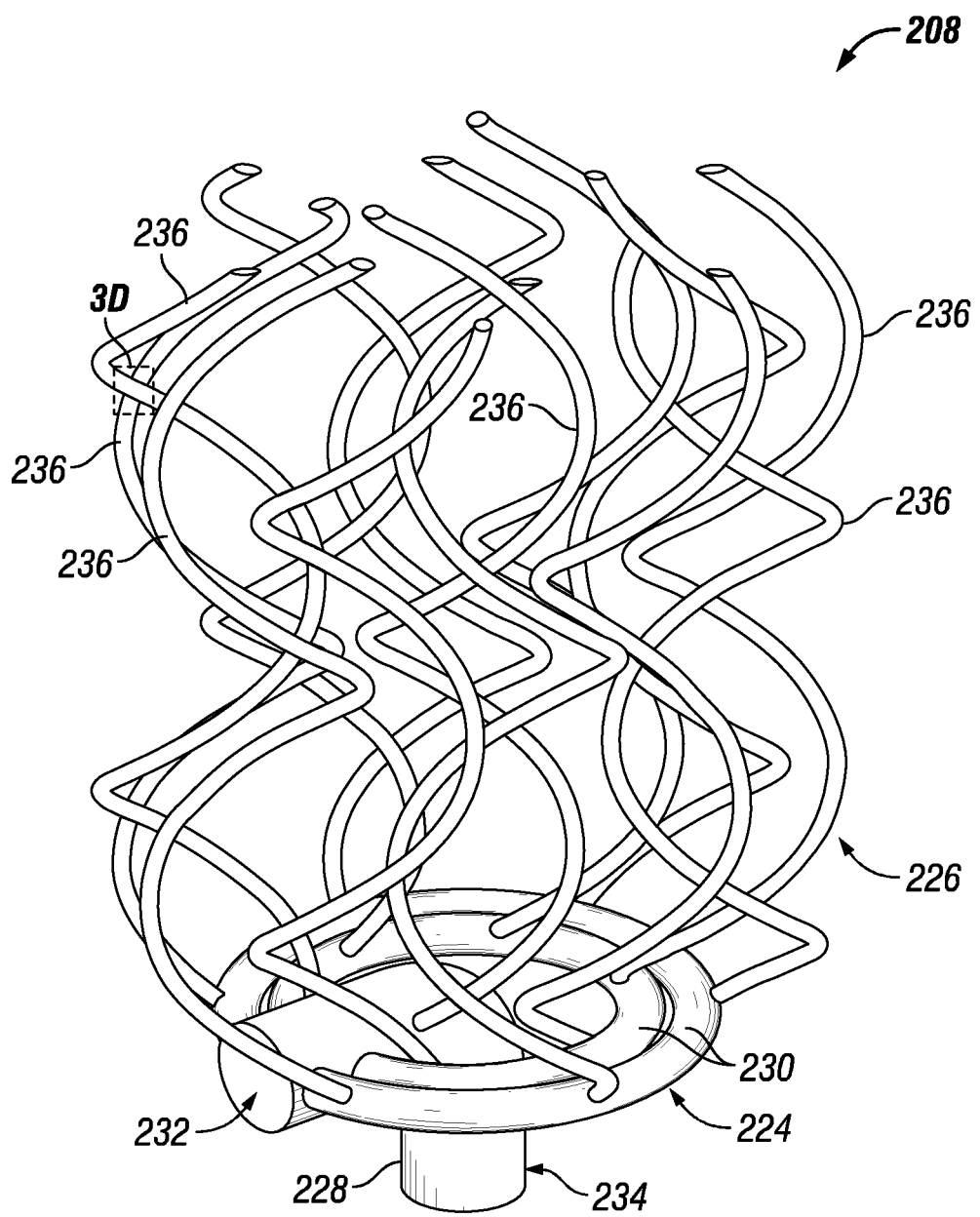
FIG. 3C illustrates an isometric view of the fluid distribution system of FIGS. 3A and 3B, according to one or more embodiments of the disclosure.
Figure 3D:
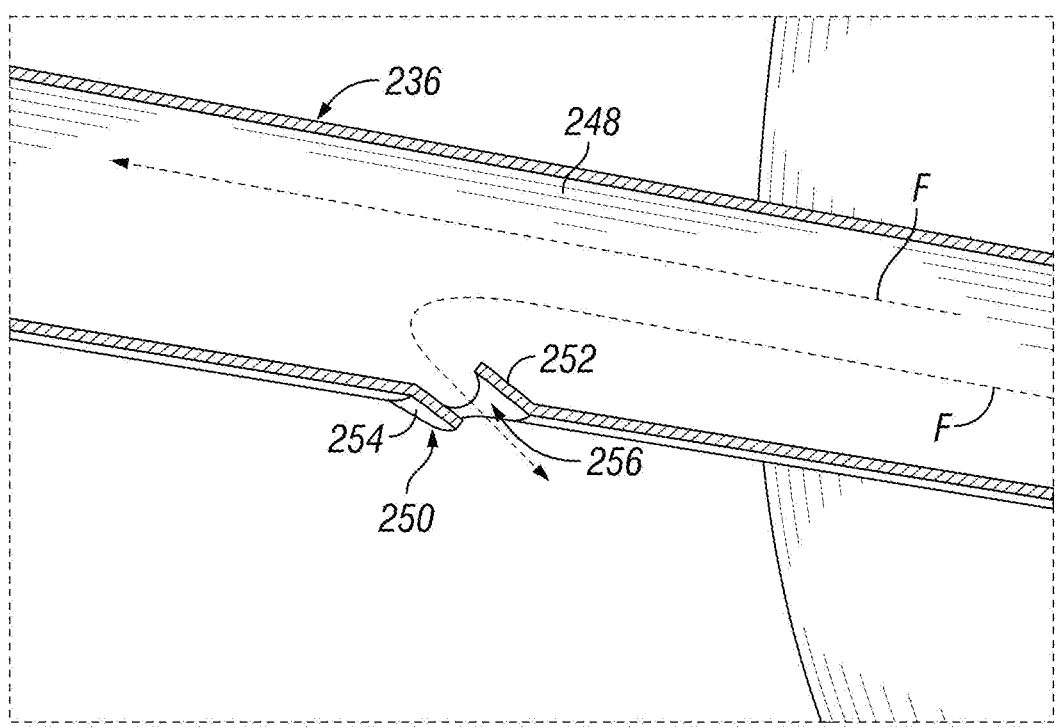
FIG. 3D illustrates an enlarged view of the portion of the fluid distribution system indicated by the box labeled 3D of FIG. 3C, according to one or more embodiments of the disclosure.

As discussed, the fluid distribution system 208 may be disposed in the reaction chamber 202 of the reactor vessel 200. FIGS. 3A-3D further illustrate multiple views of the fluid distribution system 208. Specifically, FIGS. 3A-3C illustrate respective rear, top, and isometric views of the fluid distribution system 208 of FIG. 2, according to one or more embodiments of the disclosure. FIG. 3D illustrates an enlarged view of the portion of the fluid distribution system 208 indicated by the box labeled 3D of FIG. 3C, according to one or more embodiments of the disclosure.

The fluid distribution system 208 may be disposed within the reaction chamber 202 and fluidly coupled with the vessel inlet 212. As arranged, the fluid distribution system 208 may be configured to disperse the fluid mixture into the reaction chamber 202 in multiple locations therein to distribute the fluid mixture substantially throughout the reaction chamber 202. In an exemplary embodiment, the fluid distribution system 208 may distribute the fluid mixture such that heat released by oxidization of the fuel component in the fluid mixture maintains a temperature substantially throughout the reaction chamber 202 at a temperature sufficient to oxidize the fuel component in the fluid mixture.

The fluid distribution system 208 may include a radial distribution component 224 and an axial distribution component 226 fluidly coupled with one another. The radial distribution component 224 may be disposed adjacent the vessel inlet 212 and may include a fluid distribution system inlet 228 fluidly coupled with the vessel inlet 212 and one or more annular distribution conduits 230 (two are shown) fluidly coupled with one another and with the fluid distribution system inlet 228. Although two annular distribution conduits 230 are illustrated, one of ordinary skill in the art will be appreciate that the disclosure is not limited thereto, and the fluid distribution system 208 may include one annular distribution conduit 230 in one embodiment, and in other embodiments, the distribution may include three or more annular distribution conduits 230.

In an exemplary embodiment, the fluid distribution system inlet 228 may have a radially extending portion 232 and an axially extending portion 234, thereby forming an elbow fluidly connecting the vessel inlet 212 and the annular distribution conduits 230. In another embodiment, the fluid distribution system inlet 228 may form a T-shape, thereby fluidly connecting the vessel inlet 212 and the one or more annular distribution conduits 230. The configuration of the fluid distribution system inlet 228 may vary based at least on the fluid mixture, the flow rate of the fluid mixture, the configuration of the reaction chamber 202 and the components included therein. In an exemplary embodiment, the fluid distribution system inlet 228 may be configured to position the annular distribution conduits 230 adjacent, e.g., in close proximity to, the axial end 214 of the reactor vessel 200 having the vessel inlet 212. By positioning the annular distribution conduits 230 accordingly, the annular distribution conduits 230 may be less susceptible to axial relative motions during thermal transients.

The annular distribution conduits 230 may be disposed in a nesting relationship such that each annular distribution conduit 230 is radially offset from another annular distribution conduit 230 as disposed in the reaction chamber 202. As arranged, the annular distribution conduits 230 may be concentric, and each annular distribution conduit 230 may have opposing ends terminating in the fluid distribution system inlet 228, such that fluid communication may be provided between the fluid distribution system inlet 228 and the respective annular distribution conduit 230. As illustrated, each end of the annular distribution conduit 230 is fluidly coupled with the fluid distribution system inlet 228 along the radially extending portion thereof 232; however, one of ordinary skill in the art will be appreciate that the disclosure is not limited thereto, and each end of the annular distribution conduit 230 may be fluidly coupled with the fluid distribution system inlet 228 along the axially extending portion 234 thereof in some embodiments.

As discussed, the axial distribution component 226 of the fluid distribution system 208 may be fluidly coupled with the radial distribution component 224 and disposed within the reaction chamber 202. In one or more embodiments, the axial distribution component 226 may include a plurality of helical conduits 236 extending from the annular distribution conduits 230 and along the longitudinal axis 210 of the reactor vessel 200. In another embodiment, the axial distribution component 226 may include a plurality of helical conduits 236 extending from the fluid distribution system inlet 228 and along the longitudinal axis 210 of the reactor vessel 200. In other embodiments, the axial distribution component 226 may include a plurality of helical conduits 236 extending from the fluid distribution system inlet 228 and one or more of the annular distribution conduits 230 and along the longitudinal axis 210 of the reactor vessel 200. As illustrated in FIG. 2, the plurality of helical conduits 236 may extend from the fluid distribution system inlet 228 and each of the annular distribution conduits 230 and along the longitudinal axis 210 of the reactor vessel 200.

The plurality of helical conduits 236 may be fluidly coupled with the annular distribution conduits 230 and arranged circumferentially spaced from one another along each annular distribution conduit 230. In an exemplary embodiment, each of the helical conduits 236 is uniformly spaced from one another along each annular distribution conduit 230. As uniformly spaced along each annular distribution conduit 230, the plurality of helical conduits 236 may be configured to provide a uniform spatial distribution of the fluid mixture flowing therethrough and into the reaction chamber 202. The number of helical conduits 236 in the axial distribution component 226 may be based at least in part on the intended flow capacity of the fluid distribution system 208 including the radial distribution component 224 thereof.

In an exemplary embodiment, each of the helical conduits 236 may extend substantially the axial length of the reaction chamber 202. As most clearly illustrated in FIG. 3B, each of the helical conduits may have a helix axis 238 about which the helical conduit 236 turns or curves in a spiral form. Each complete turn (360 degree turn) of the helical conduit 236 about the helix axis 238 may define the diameter 240 of the helical conduit. In an exemplary embodiment, the diameter 240 of each of the helical conduits 236 may be about a third of a lateral diameter 242 of the reaction chamber.

A tangent line 244 at any point along the helical conduit 236 may make a constant angle $\alpha$ with a transverse axis 246 perpendicular to the helix axis 238. Such an angle $\alpha$ may be referred to herein as a helix angle $\alpha$ and is illustrated most clearly in FIG. 3A. In an exemplary embodiment, the helix angle $\alpha$ may be greater than about forty-five degrees to minimize relative movement effects. In another embodiment, the helix angle $\alpha$ may be greater than about fifty degrees. In another embodiment, the helix angle $\alpha$ may be greater than about fifty-five degrees. In another embodiment, the helix angle $\alpha$ may be greater than about sixty degrees.

As shown in FIG. 3D, each helical conduit 236 may have a tubular sidewall 248 forming one or more nozzles 250 configured to spatially distribute the fluid mixture into the reaction chamber 202. In one or more embodiments, each of the one or more nozzles 250 may be cast as a separate piece and may be coupled to the helical conduit 236 via a welded connection or other suitable coupling or fastening method known in the art. Each nozzle 250 may be formed from a generally conical inward distortion 252 and a generally conical outward distortion 254 of the tubular sidewall 248 defining a fluid dispersion orifice 256 oriented to disperse fluid mixture flowing therethrough toward the vessel inlet 212 as indicated by arrow F. One or more of the fluid dispersion orifices 256 may be sized and configured to provide a fixed flow capacity with a favorable pressure drop and flow dispersion characteristics.

The foregoing has outlined features of several embodiments so that those skilled in the art may better understand the present disclosure. Those skilled in the art should appreciate that they may readily use the present disclosure as a basis for designing or modifying other processes and structures for carrying out the same purposes and/or achieving the same advantages of the embodiments introduced herein. Those skilled in the art should also realize that such equivalent constructions do not depart from the spirit and scope of the present disclosure, and that they may make various changes, substitutions and alterations herein without departing from the spirit and scope of the present disclosure.

We claim:

1. A fluid distribution system for a reactor vessel defining a reaction chamber, comprising:
   a radial distribution component positionable within the reaction chamber and adjacent a vessel inlet at an end portion of the reactor vessel, the radial distribution component comprising:
   a fluid distribution system inlet configured to couple with the vessel inlet and receive a fluid mixture provided to the reactor vessel; and
   one or more annular distribution conduits fluidly coupled with the fluid distribution system inlet and configured to receive the fluid mixture provided to the fluid distribution system; and
   an axial distribution component positionable within the reaction chamber to extend from the radial distribution component along a longitudinal axis of the reactor vessel, the axial distribution component comprising:
   a plurality of helical conduits fluidly coupled with the one or more annular distribution conduits and configured to receive the fluid mixture from the one or more annular distribution conduits and to disperse the fluid mixture uniformly within the reaction chamber, wherein each helical conduit of the plurality of helical conduits forms one or more nozzles configured to disperse the fluid mixture uniformly within the reaction chamber, wherein:
each helical conduit of the plurality of helical conduits forms a plurality of nozzles configured to disperse the fluid mixture uniformly within the reaction chamber; and
each helical conduit comprises a tubular sidewall forming the plurality of nozzles spaced apart from one another along a length of the helical conduit, each nozzle being formed by a conical inward distortion of the tubular sidewall and a conical outward distortion of the tubular sidewall and further defining a fluid dispersion orifice configured to disperse the fluid mixture into the reaction chamber.

2. The fluid distribution system of claim 1, wherein the radial distribution component comprises a plurality of annular distribution conduits, each annular distribution conduit disposed radially offset from another annular distribution conduit.

3. The fluid distribution system of claim 2, wherein the plurality of annular distribution conduits are arranged such that at least one annular distribution conduit nests within one other annular distribution conduit.

4. The fluid distribution system of claim 1, wherein the fluid distribution system inlet comprises
an axially extending portion configured to couple with the vessel inlet; and
a radially extending portion fluidly coupled with the one or more annular distribution conduits.

5. The fluid distribution system of claim 1, wherein at least one helical conduit of the plurality of helical conduits is fluidly coupled to the fluid distribution system inlet and configured to receive the fluid mixture from the fluid distribution system inlet and to disperse the fluid mixture uniformly within the reaction chamber.

6. The fluid distribution system of claim 1, wherein:
an inner perimeter of a housing of the reactor vessel defines an axial length of the reaction chamber and a diameter of the reaction chamber;
each helical conduit of the plurality of helical conduits is configured to extend substantially the axial length of the reaction chamber; and
a diameter of each helical conduit the plurality of helical conduits is about one-third the diameter of the reaction chamber.

7. The fluid distribution system of claim 1, wherein:
a transverse axis of the reactor vessel extends perpendicularly from the longitudinal axis of the reactor vessel; and
a helix angle formed by a tangent line extending from a point on a helical conduit of the plurality of helical conduits and the transverse axis is greater than about forty-five degrees.

8. A reactor vessel comprising:
a longitudinal axis;
a housing extending along the longitudinal axis and having an outer surface and an inner surface, the inner surface defining a reaction chamber configured to receive a dispersed fluid mixture therein;
a vessel inlet disposed at a first end of the housing and fluidly coupled to the reaction chamber;
a vessel outlet disposed at a second end of the housing axially opposing the first end of the housing, the vessel outlet fluidly coupled to the reaction chamber;
a fluid distribution system disposed within the reaction chamber and fluidly coupled to the vessel inlet, the fluid distribution system comprising
a radial distribution component disposed adjacent the first end of the housing (and fluidly coupled to the vessel inlet, the radial distribution component configured to receive a fluid mixture provided to the reactor vessel; and
an axial distribution component extending from the radial distribution component along the longitudinal axis of the reactor vessel, the axial distribution component comprising:
a plurality of helical conduits fluidly coupled with the radial distribution component and configured to receive the fluid mixture from the radial distribution component and to disperse the fluid mixture uniformly within the reaction chamber, wherein the radial distribution component comprises:
a fluid distribution system inlet coupled with the vessel inlet and configured to receive the fluid mixture provided to the reactor vessel; and
one or more annular distribution conduits fluidly coupled with the fluid distribution system inlet and configured to receive the fluid mixture provided to the fluid distribution system, wherein the radial distribution component further comprises a plurality of annular distribution conduits disposed concentrically within the reaction chamber, such that at least one annular distribution conduit nests within one other annular distribution conduit.

9. The reactor vessel of claim 8, wherein:
each helical conduit comprises a tubular sidewall; and
the tubular sidewall of each helical conduit of the plurality of helical conduits forms one or more nozzles configured to disperse the fluid mixture uniformly within the reaction chamber, each nozzle of the one or more nozzles defining a fluid dispersion orifice.

10. The reactor vessel of claim 9, wherein the plurality of helical conduits are circumferentially spaced apart from one another about each annular distribution conduit of the plurality of annular distribution conduits.

11. The reactor vessel of claim 9, wherein at least one helical conduit of the plurality of helical conduits is fluidly coupled to the fluid distribution system inlet and configured to receive the fluid mixture from the fluid distribution system inlet and to disperse the fluid mixture uniformly within the reaction chamber.

12. A gas turbine system comprising:
a compressor configured to receive a fluid mixture from a fuel source and an oxygen source and compress the fluid mixture, the fluid mixture comprising a fuel component and an oxygen component;
a reactor vessel fluidly coupled to the compressor and configured to receive a compressed fluid mixture in a reaction chamber defined by an inner surface of a housing of the reactor vessel and to oxidize the fuel component of the fluid mixture, thereby generating thermal energy, the reactor vessel comprising a fluid distribution system configured to uniformly disperse the compressed fluid mixture within the reaction chamber, the fluid distribution system comprising:
a radial distribution component disposed adjacent an end portion of the housing and fluidly coupled to a vessel inlet of the reactor vessel, the radial distribution component configured to receive the compressed fluid mixture provided to the reactor vessel; and
an axial distribution component extending from the radial distribution component along a longitudinal axis of the reactor vessel, the axial distribution component comprising a plurality of helical conduits fluidly coupled with the radial distribution component and configured to receive the compressed fluid mixture from the radial distribution component and to disperse the compressed fluid mixture uniformly within the reaction chamber; and an expander fluidly coupled to the reactor vessel and configured to convert the thermal energy generated by the compressed fluid mixture to mechanical energy, wherein:

the radial distribution component comprises a plurality of annular distribution conduits disposed concentrically within the reaction chamber, such that at least one annular distribution conduit nests within one other annular distribution conduit;

the plurality of helical conduits are circumferentially spaced apart from one another about each annular distribution conduit of the plurality of annular distribution conduits, and each helical conduit comprises a tubular sidewall defining one or more fluid dispersion orifices configured to disperse the compressed fluid mixture into the reaction chamber.

13. The gas turbine system of claim 12, wherein the radial distribution component comprises:

a fluid distribution system inlet coupled with the vessel inlet and configured to receive the compressed fluid mixture provided to the reactor vessel; and one or more annular distribution conduits fluidly coupled with the fluid distribution system inlet and configured to receive the compressed fluid mixture provided to the fluid distribution system.

14. The gas turbine system of claim 13, wherein at least one helical conduit of the plurality of helical conduits is fluidly coupled to the fluid distribution system inlet and configured to receive the compressed fluid mixture from the fluid distribution system inlet and to disperse the fluid mixture uniformly within the reaction chamber.

15. The gas turbine system of claim 12, further comprising:

a generator mechanically coupled to the expander via a drive shaft, the generator configured to convert the mechanical energy provided by the expander to electrical energy; and a heat exchanger fluidly coupled to the compressor and the reactor vessel and configured to pre-heat the compressed fluid mixture received from the compressor and supply a pre-heated compressed fluid mixture to the reactor vessel.

* * * * *